US008774087B2

(12) United States Patent
Tapia et al.

(10) Patent No.: US 8,774,087 B2
(45) Date of Patent: Jul. 8, 2014

(54) SIGNALING MESSAGE PRIORITIZATION (75) Inventors: Pablo Tapia, Snoqualmie, WA (US); Jun Liu, Issaquah, WA (US); Mark McDiarmid, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 703 days.

(21) Appl. No.: 12/748,288

(22) Filed: Mar. 26, 2010

(65) Prior Publication Data
US 2011/0235575 A1   Sep. 29, 2011

(51) Int. Cl.
*H04W 4/00* (2009.01)

(52) U.S. Cl.
USPC .......................................................... 370/328

(58) Field of Classification Search
USPC ................... 370/230, 349, 352, 328
See application file for complete search history.

(56) References Cited

U.S. PATENT DOCUMENTS

| 6,718,326 B2* | 4/2004 | Uga et al. ............................. 1/1 |
| 2004/0146019 A1* | 7/2004 | Kim et al. ..................... 370/329 |
| 2006/0198308 A1* | 9/2006 | Vasseur et al. ................. 370/238 |
| 2008/0172471 A1 | 7/2008 | Berstis |
| 2009/0199207 A1 | 8/2009 | Thomas et al. |
| 2010/0067519 A1* | 3/2010 | Mang et al. .................... 370/352 |

FOREIGN PATENT DOCUMENTS

EP    1973293 A1    9/2008

OTHER PUBLICATIONS

The PCT Search Report & Written Opinion mailed Nov. 30, 2011 for PCT Application No. PCT/US11/29259, 9 pages.

* cited by examiner

*Primary Examiner* — Mark Rinehart
*Assistant Examiner* — Mohammad Anwar
(74) *Attorney, Agent, or Firm* — Lee & Hayes, PLLC (57) ABSTRACT

Methods, system, and articles are described herein for receiving and prioritizing a plurality of signaling messages based at least on classifications of the signaling messages. At least a number of the signaling messages are processed in order of priority, the number processed being based at least on a volume of the signaling messages.

17 Claims, 6 Drawing Sheets

SIGNALING MESSAGE PRIORITIZATION

BACKGROUND

Increasingly, servers and other computing devices receive communications and establish connections with a wide variety of telecommunication devices and computer systems to transmit voice calls, emails, text and instant messages, and application and user data. Such communications and connections typically involve the transmission of both signaling and payload messages. Signaling messages, such as Radio Resource Control (RRC) reconfiguration of radio bearers or General Packet Radio Service (GPRS) Packet Data Protocol (PDP) context establishments, are often used in the control plane to establish the connections or to indicate the transmission of data in the user plane (payload). Because signaling messages are not typically used to transmit the data payloads, they are often relatively small and, individually, do not impose a large demand on the processing resources of the receiving device. With the increasing volume of signaling messages observed from the increasing use of smartphone applications, however, there is a risk of such signaling messages overwhelming the devices receiving and processing them.

Payload messages can be quite large and thus impose a significant demand on processing resources. To enable orderly processing of these payload messages, receiving devices often use one of a number of quality-of-service algorithms that limit the number of payload messages processed, order those messages, or offload processing of some of the payload messages to another device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for prioritizing signaling messages, such as radio signaling messages. The signaling messages are transmitted from one computing device to another to request or establish a connection, to initiate the transfer of data, or to request updates. The receiving computing device can receive many of these signaling messages at the same time, making it difficult to process all the messages at once. To make sure that the "higher priority" or "highest priority" messages get processed first, the techniques described herein enable the receiving device to determine a classification of each received signaling message and to prioritize the messages based on those classifications. What is considered "higher priority" or "highest priority" may vary and could be specified, for example, by an operator of the receiving device or by a protocol for classifying the signaling messages. The receiving computing device determines the classification for each message by examining representations of the classifications included in header fields of the signaling messages. These representations and their associated classifications are in turn specified by a signaling classification protocol, such as a radio signaling classification protocol.

Once the signaling messages have been prioritized, the receiving computing device can compare the volume of the received signaling messages to a threshold. If the volume exceeds the threshold, the receiving computing device limits the number of the signaling messages it processes. The receiving computing device then processes at least a number of the signaling messages in order of priority and discards or queues unprocessed signaling messages. If a sending computing device repeatedly retransmits a queued or discarded signaling message, the receiving computing device replies with a request that the sending computing device wait for a time period before retransmitting again.

In formulating the signaling messages, the sending computing device also makes reference to the signaling classification protocol to determine a classification for a signaling message and a representation of that classification. For example, the signaling classification protocol may specify a classification corresponding to each type of communication possible for the sending computing device, organize those classifications into a few categories, such as "voice," "high priority data signaling," "low priority data signaling," and "updates" and associate a representation with each category.

Overview

Figure 1:
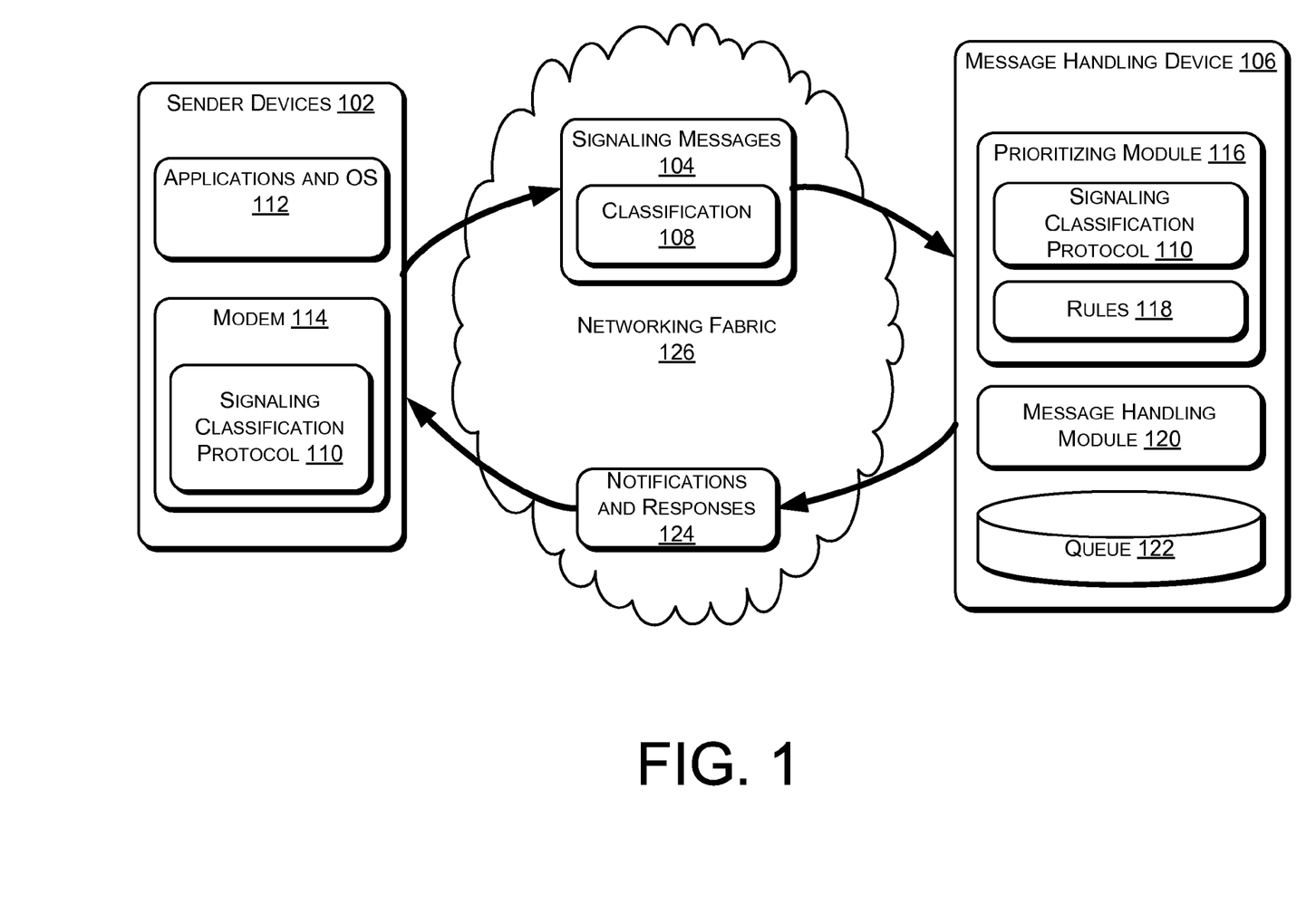
FIG. 1 is a block diagram showing an overview of systems involved in signaling message prioritization, in accordance with various embodiments.

FIG. 1 illustrates an overview of systems involved in signaling message prioritization, in accordance with various embodiments. As shown in FIG. 1, sender devices 102 transmit signaling messages 104 to a message handling device 106. The signaling messages 104 include classifications 108 that are used by the message handling device 106 to prioritize the signaling messages 104. The classifications 108 for the signaling messages 104 are specified by a signaling classification protocol 110 that is used by applications or operating systems (OS) 112 and modems 114 of the sender devices 102 in formulating the signaling messages 104. The signaling classification protocol 110 is also used by a prioritization module 116 of the message handling device 106 in prioritizing the signaling messages 104. In addition to the signaling classification protocol 110, the prioritizing module 116 may also use rules 118 in prioritizing the signaling messages 104. The message handling device 106 also includes a message handling module 120 to handle the signaling messages 104 and a queue 122 to store unprocessed signaling messages 104. Handling the signaling messages 104 can include replies and notifications 124 transmitted by the message handling device 106 to the sender device 102. Both the signaling messages 104 and the notifications and replies 124 are communicated across a networking fabric 126 that connects the sender devices 102 and the message handling device 106.

In various embodiments, the sender devices 102 are any number of like or varied computing and telecommunication devices. Sender devices 102 may include a telecommunication device, a personal digital assistant (PDA), a personal computer (PC), a tablet computer, a workstation, a server system, a television, a media player, a digital video recorder, a game device, or a set-top box, or any other sort of device. The sender devices 102 can be in a single location or be in varied locations, can be associated with a single user or service subscriber or be associated with a number of users/subscribers and can have any of a variety of purposes (e.g., work phone, home computer, etc.). In one embodiment, the sender devices 102 implement among themselves a network such as a personal area network (PAN), local area network (LAN), or wide area network (WAN) and communicate with each other via that network. In other embodiments, the sender devices 102 are not associated with each other. An example sender device 102 is illustrated in greater detail in FIG. 6 and is described in detail below with reference to that figure.

As shown in FIG. 1 and mentioned above, the sender devices 102 can be connected to the networking fabric 126, can send signaling messages 104 and receive notifications and responses 124. Also, the sender devices 102 can transmit payload delivery messages (not shown) to the message handling device 106. The participation of the sender devices 102 in these and other operations is described further below with reference to the operations of the applications and OS 112 and the modem 114.

In various embodiments, the sender devices 102 include networking stacks, protocols, or modules (not shown) included in the modem 114 for transmitting signaling messages 104 and other traffic from the applications and OS 112 to the message handling device 106 and for receiving notifications and responses 124. The stacks, protocols, and modules can include a uniform mobile telecommunications system (UMTS) wideband code division multiple access (WCDMA) stack, a WiMAX stack, an evolved universal terrestrial radio access (E-UTRA) stack, a SIP client, a TCP/IP stack, among others. Such stacks, protocols, and modules format messages for transmission by, for example, encapsulating the messages in packets with packet headers corresponding to protocols, such as WiMAX, RRC, PDP, LTE, or SIP protocols RRC and PDP protocols are used in UMTS and LTE systems. In other embodiments, rather than utilizing stacks, protocols, and modules for message formatting and delivery, the applications and OS 112 are configured to perform the formatting and delivery.

The applications and OS 112 include any sort of applications, such as voice and telephony applications, email applications, text and instant messaging applications, location providing applications, and any other sort of application that communicates with another device to, for example, receive periodic updates. The applications and OS 112 also include operating systems such as those belonging to the Microsoft Windows® family of operating systems, UNIX operating systems, and other sorts of operating systems that receive, for example, remote updates and maintenance. The applications and OS 112 can include executable instructions for performing various operations and, optionally, data stored in databases or registries to be used by the executable instructions.

The modem 114 can be any sort of modem, such as a modem used in telecommunication devices to provide an air interface and wireless connectivity to a service provider network. As mentioned above, the modem 114 can include stacks, protocols, and other modules to classify and transmit signaling messages 104.

In some embodiments, the sender devices 102 can send any sort of signaling messages 104 to the message handling device 106. For example, sender devices 102 can send connection requests, update requests, notifications of the transfer of voice, email, text, or instant message packets that may be transmitted in separate payload messages. Sender devices 102 can also respond to requests and establish network connections. For example, to establish a UMTS voice connection with a message handling device 106, a sender device 102 sends a RRC Connection Request to the message handling device, receives a RRC Connection Response, and sends an RRC Connection Setup Complete response. Each of these transmitted messages constitutes a signaling message 104.

As also shown in FIG. 1, the modem 114 can utilize a signaling classification protocol 110 to determine classifications 108 for the signaling messages 104 as part of the formulation of the signaling messages 104. Classifications 108 can correspond to specific types of signaling messages 104, such as "Voice Signaling," a specific type of request or response, such as "Voice Connection Setup," "Data Connection Setup," or "Data Bearer Reconfiguration." Classifications 108 can also correspond to groups or categories of classifications, as the groups or categories being or including one or more of: "voice call," "high priority data signaling," "low priority data signaling," "update," "PDP context establishment," "RRC connection establishment request," "RRC radio bearer reconfiguration," "RRC release," "RRC paging message," "cell updates," or "SIP request or response." The signaling classification protocol 110 specifies both the groups/categories and the classifications 108 belonging to each group/category so that the modem 114 can determine a group/classification by comparing a signaling message type to the list of classifications 108.

In addition, the signaling classification protocol 110 specifies representations of the classifications 108 and categories to be included in the signaling messages 104. The representations are bit patterns, such a "000," "010," etc. and can have a length specified by the signaling classification protocol 110. The modem 114 utilizes the determined classification 108 or group/category to ascertain the representation to include in the signaling message 104 being formulated.

Figure 2:
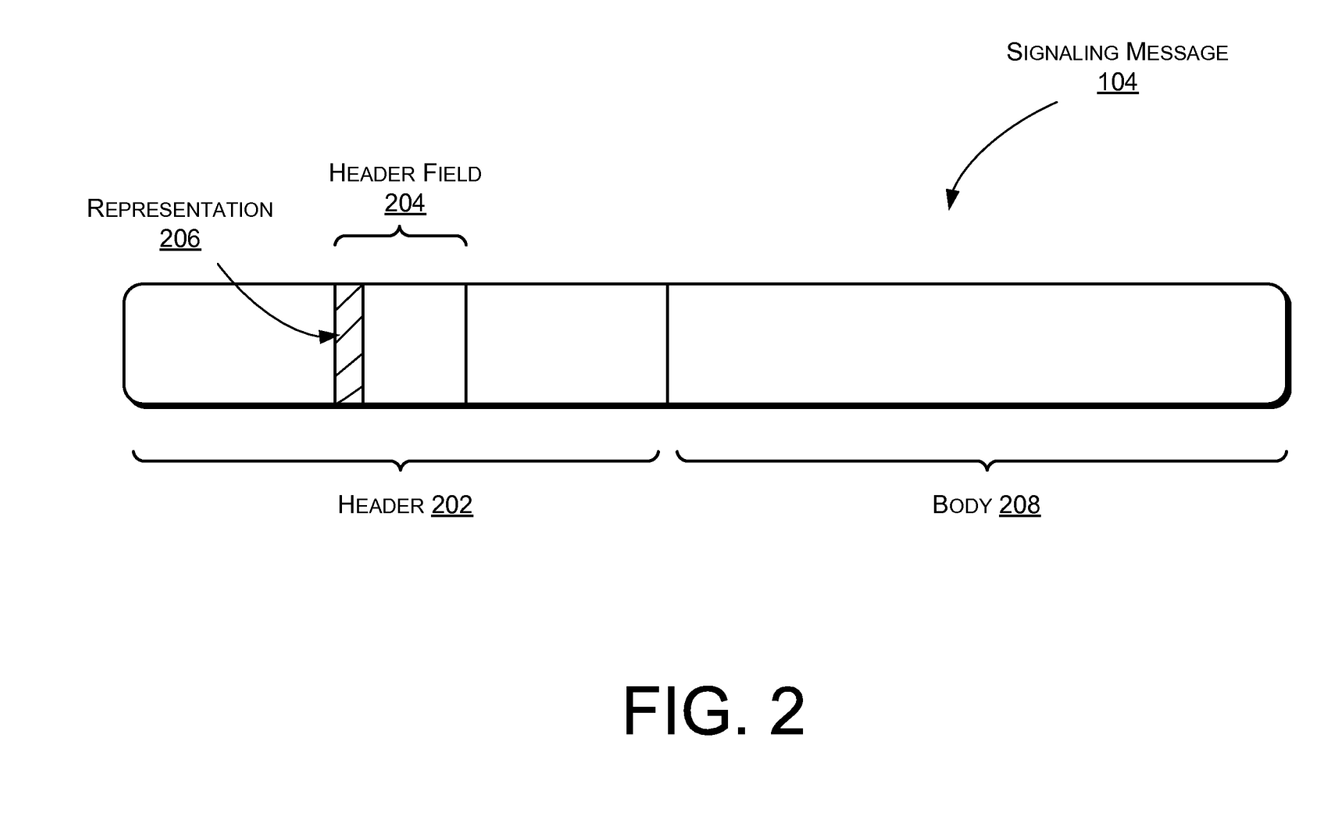
FIG. 2 is a block diagram of an example signaling message including a representation of a classification to be used in prioritizing the signaling message, in accordance with various embodiments.

In addition to the length of the representation, the signaling classification protocol 110 specifies a header field of the signaling message 104 and location within the header field in which the representation is to be included. FIG. 2 shows an example signaling message 104, including a header 202, a header field 204, a representation 206, and a message body 208. While the representation 206 is shown as being located within header field 204, the representation 206 could instead be located in any other part of the header 202 or in the body 208. Each of the header 202, header field 204, representation 206, and body 208 may have a predetermined bit size that the application and OS 112 and modem 114 must utilize if formulating the signaling messages 104. The predetermined sizes of the header 202, header field 204, and body 208 may be determined by the protocol utilized to encapsulate and transmit the signaling message 104. In one embodiment, the size of the representation 206 and the header field 204 in which it is placed may vary based on the communication protocol used to transmit the signaling message. For example, the signaling classification protocol 110 can specify that the representation 206 has a first size and a first header field location with a first communication protocol and a second size and a second header field location with a second communication protocol.

Having ascertained the header field, representation location, and representation from the signaling classification protocol 110, the modem 114 completes the formation and transmission of the signaling message 104. In some embodiments, as mentioned above, some or all of the aspects of the signaling message 104 formation are performed by stacks, protocols, or modules of the modem 114. In other embodiments, all of the aspects are performed by the application and OS 112.

In addition to transmitting the signaling messages 104, the application and OS 112 and modem 114 can transmit payload delivery messages (not shown). For example, if the signaling message 104 requests transmission of a voice call, the actual data corresponding to the contents of the voice call (e.g., audio data packets) may be transmitted by the application and OS 112 and modem 114 as payload delivery messages. In some embodiments, the payload delivery messages also have classifications used by quality-of-service algorithms of the message handling device 106. The classifications of the payload delivery messages can be the same as classifications 108 of the signaling messages 104 or can be different from the classifications 108 of the signaling messages 104.

As further shown in FIG. 1, the sender devices 102 can also receive notifications and responses 124 from the message handling device 106. The notifications and responses 124 can communicate that a requested action was performed or that a connection was established. The notifications and responses 124 can also communicate that the signaling message 104 was queued or discarded because, for instance, the message handling device 106 was overloaded. Additionally, the notifications and responses 124 may request that the sender devices 102 refrain from retransmitting a signaling message 104 for a specified period of time. The sender devices 102 then wait for that time period before retransmitting the signaling message 104 that the request 124 was sent in reply to. In one embodiment, the stacks, protocols, and modules of the modem 114 mentioned above include a module configured to receive requests 124 to limit retransmitting before the expiration of the specified time period.

Figure 5:
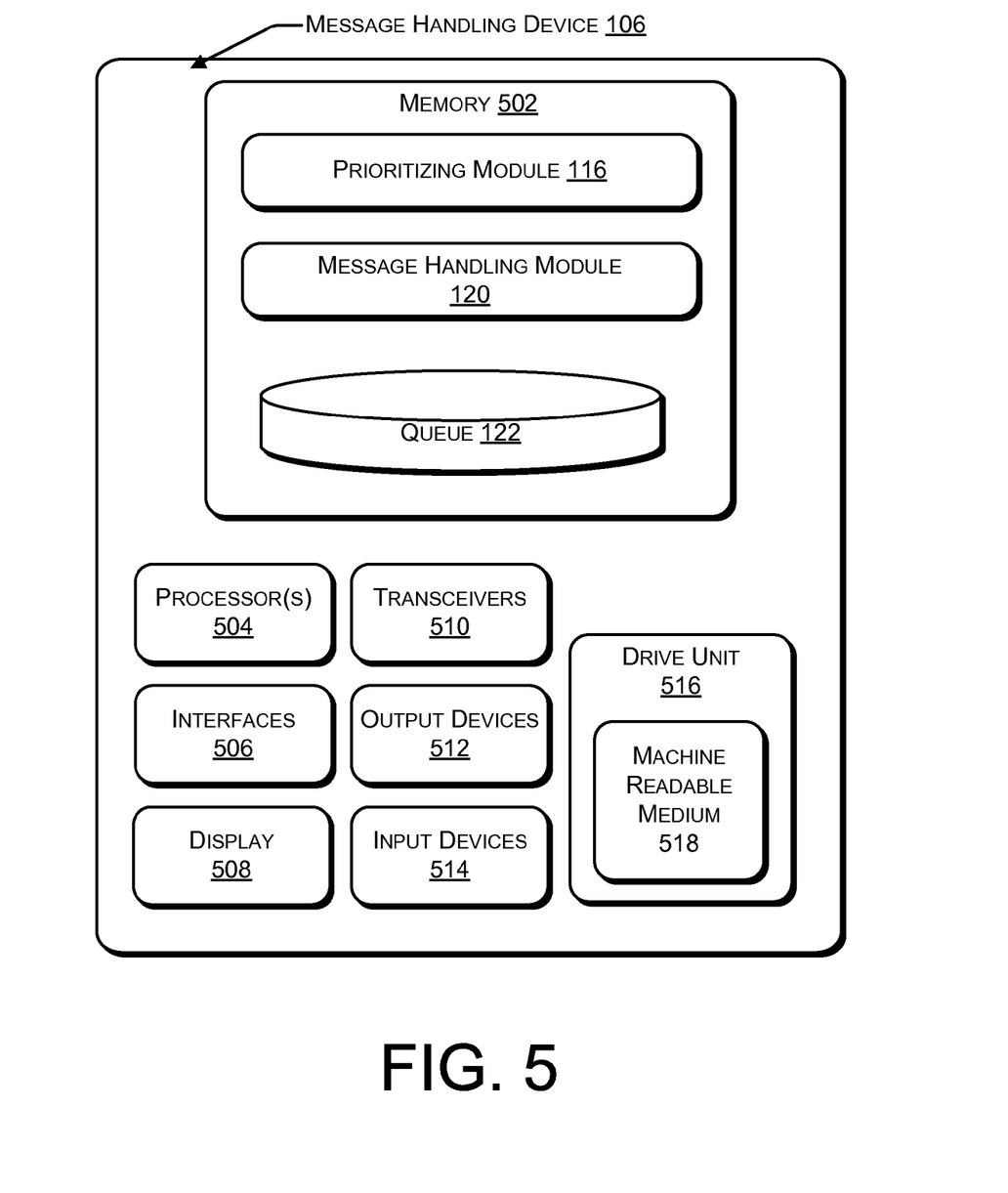
FIG. 5 is a block diagram showing a component level view of a message handling device, in accordance with various embodiments.

In various embodiments, the message handling device 106 is any sort of computing device. The message handling device 106 can be a PC, a laptop computer, a workstation, a server system, a mainframe, a server farm, a telecommunication device, a PDA, a tablet computer, a television, a media player, a digital video recorder, a game device, or a set-top box, or any other sort of device. An example message handling device 106 is illustrated in FIG. 5 and is described below in further detail in reference to that figure.

The message handling device 106 is either the ultimate destination of the signaling message 104 or, for example, and edge device of a private network to which the signaling message 104 is destined. The message handling device 106 may also be associated with a service provider, such as a provider of telecommunication services or data services. The message handling device 106 also includes interfaces enabling operators or other users to configure the message handling device 106 by, for instance, specifying rules for use in signaling message prioritization, for specifying volume thresholds, or for specifying retransmission wait times.

In some embodiments, the message handling device 106 receives multiple signaling messages 104 at substantially the same time. For example, the message handling device 106 might receive thousands of signaling messages 104 in a two millisecond time frame. Upon receipt, these signaling messages 104 are queued for processing in a structure associated with stacks, protocols or modules (not shown) of the message handling device 106. In other embodiments, the prioritization module 116 or message handling module 120 stores and handles signaling messages 104 upon their receipt.

Either in real time or at pre-determined time intervals, the prioritization module 116 prioritizes the received signaling messages 104 based on classifications 108 of the signaling messages 104 and on rules for prioritizing based on classifications 108. To determine the classifications 108 or groups/categories of classifications 108 of the signaling messages, the prioritization module 116 utilizes the signaling classification protocol 110 to locate representations of the classifications within the signaling messages 104 and to determine the classifications 108 or groups/categories associated with the located representations.

Once the prioritization module 116 has determined a classification 108 or category for each signaling message 104, the prioritization module 116 utilizes one or more rules 118 to prioritize the signaling messages based on those classifications 108 or categories, generating an order of priority for the received signaling messages 104. In some embodiments, the rules 118 are specified by an operator or specified in the signaling classification protocol 110. The rules 118 can specify a processing order for various classifications or categories of signaling messages. For example, a rule 118 might assign the highest priority to signaling messages 104 having "voice" as their classification 108 or category, assign the second highest priority to signaling messages 104 having "high priority data signaling" as their classification 108 or category, and assign another lowest priority to every other signaling message 104. While three levels of priority are discussed in this example, any number of levels of priority can be specified and applied by the prioritization module 116. As there may be multiple signaling messages 104 associated with a given level of priority, the prioritization module 116 may further order signaling messages within a priority level based on their time of arrival, based on the identity of their sender, or based on some other criteria.

In one embodiment, either or both of the signaling classification protocol 110 or the rules 118 are specified as a text file, such as an extensible markup language (XML) file.

In various embodiments, the message handling module 120 first compares the volume of the received signaling messages 104 to a volume threshold. For example, the message handling device 106 may have simultaneously received six hundred signaling messages 104, but the message handling device 106 may have a volume threshold of five hundred signaling messages. In response to the comparison, the message handling module 120 limits the number of signaling messages 104 that get processed if the comparison indicates that the volume received exceeds the volume threshold. In one embodiment, the message handling module 120 performs the comparing and limiting prior to the prioritization module 116 performing the prioritizing, enabling the prioritization module 116 to perform the prioritizing if the comparison indicates that the volume exceeds the volume threshold. If the volume does not exceed the volume threshold, the message handling module 120 processes some or all of the received signaling messages 104.

The number of signaling messages 104 to be processed then includes some or all of the signaling messages 104 below the volume threshold. That number of signaling messages 104 is processed by the message handling module 120 in their order of priority as determined by the prioritization module 116. For example, signaling messages 104 having the highest and second highest levels of priority may be processed. In some embodiments, processing the number of signaling messages 104 includes replying to the signaling messages 104 or performing an act requested by the signaling messages 104. For instance, a signaling message 104 could be a RRC Connection Request and the message handling module 120 could process the request by replying with a RRC Connection Response 124.

In various embodiments, the message handling module 120 handles unprocessed signaling messages 104 in one of a number of ways. One way of handling the unprocessed signaling messages 104 is queuing those unprocessed signaling messages 104 in a queue 122. The queue 122 may be any sort of structure for storing data, such as a database, a structured or unstructured file, or a programmatic structure such as a stack or queue. The message handling module 120 stores the unprocessed signaling messages 104 in the queue 122 for later processing when the volume of received signaling messages 104 falls below the volume threshold.

The message handling module 120 can also discard unprocessed signaling messages 104. In one embodiment, the message handling module 120 queues some unprocessed signaling messages 104 and discards others. For instance, the message handling module 120 could discard unprocessed signaling messages 104 having a lower or lowest level of priority and could queue other unprocessed signaling messages 104.

For either or both of queued or discarded signaling messages 104, the message handling module 120 may or may not respond to the signaling messages 104 with a notification or response 124. In some embodiments, the notification or response 124 indicates that its corresponding signaling message 104 has been queued or discarded. If queued, the notification or response may include an estimated time until the signaling message is processed.

Additionally or alternatively, the message handling module 120 includes in the notification or response 124 a request that the sender device 102 wait for a specified time before retransmitting the signaling message 104 or sending another signaling message 104. In other embodiments, the message handling module 120 may simply discard the signaling message 104 originally received from the sender device 102. Also, in one embodiment, a request that the sender device 102 wait for a specified time before retransmitting the signaling message 104 is only transmitted if the signaling message 104 has a certain classification 108 (e.g., "update") or if the signaling message 104 corresponds to a certain level of priority (e.g., the lowest level of priority). Also, in some embodiments, the wait specified in the request is determined based at least on a classification 108 or level or priority of the unprocessed signaling message 104 (e.g., five minutes for "connection requests" and two hours for "updates").

As illustrated in FIG. 1 and mentioned above, the signaling messages 104 and notifications and responses 124 are transmitted across a networking fabric 126 connecting the sender devices 102 and the message handling device 106. In some embodiments, the networking fabric 126 represents any one or more networks, such as cellular networks and/or data networks, including WANs, LANs, PANs, and/or the Internet. A connection between the sender devices 102 and the message handling device 106 may be through a number of routers, base stations, and/or devices acting as bridges between cellular and data networks. Communications between the sender devices 102 and the message handling device 106 utilize any sort of communication protocol known in the art for sending and receiving messages. In some embodiments, network fabric 126 also includes an Internet service provider (ISP) providing Internet connectivity to the sender devices 102.

Example Operations

Figure 3:
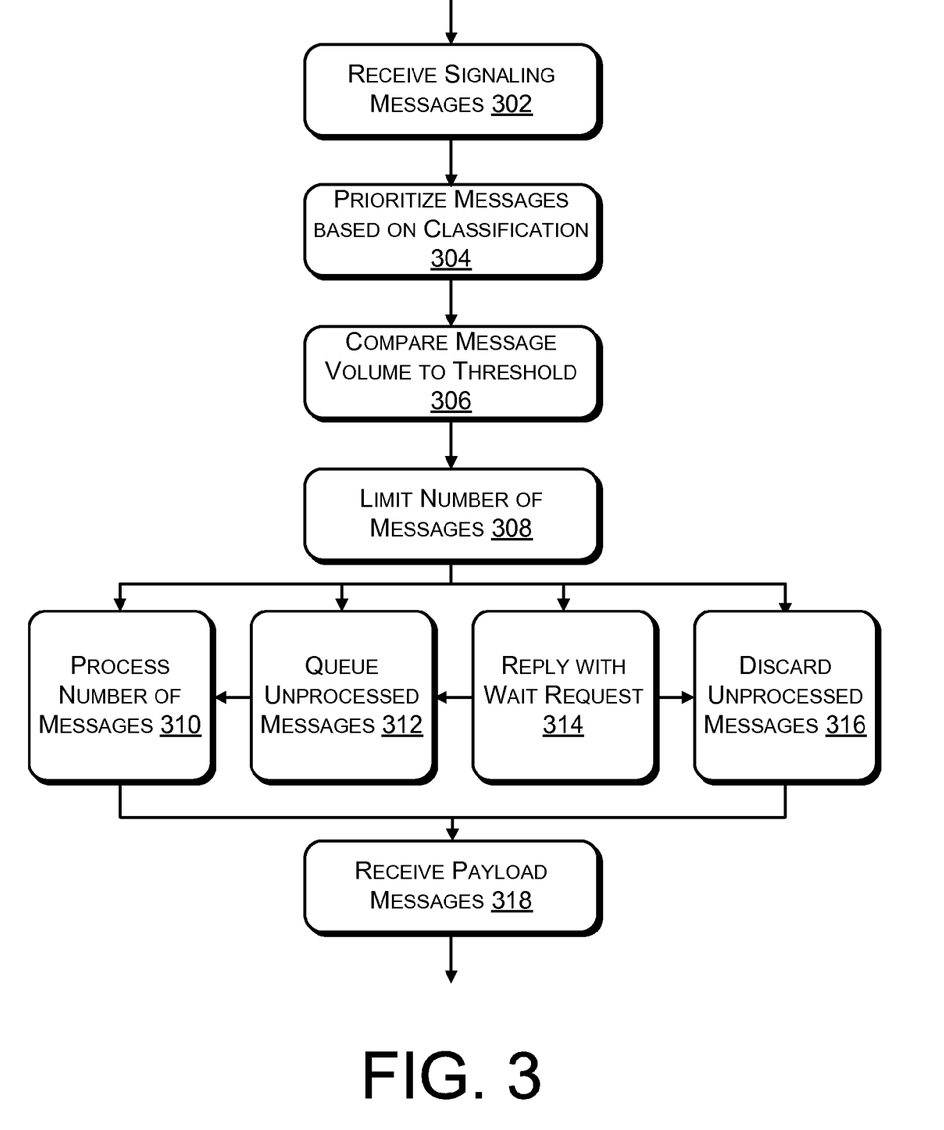
FIG. 3 is a flowchart showing a method of prioritizing and handling a received signaling message, in accordance with various embodiments.
Figure 4:
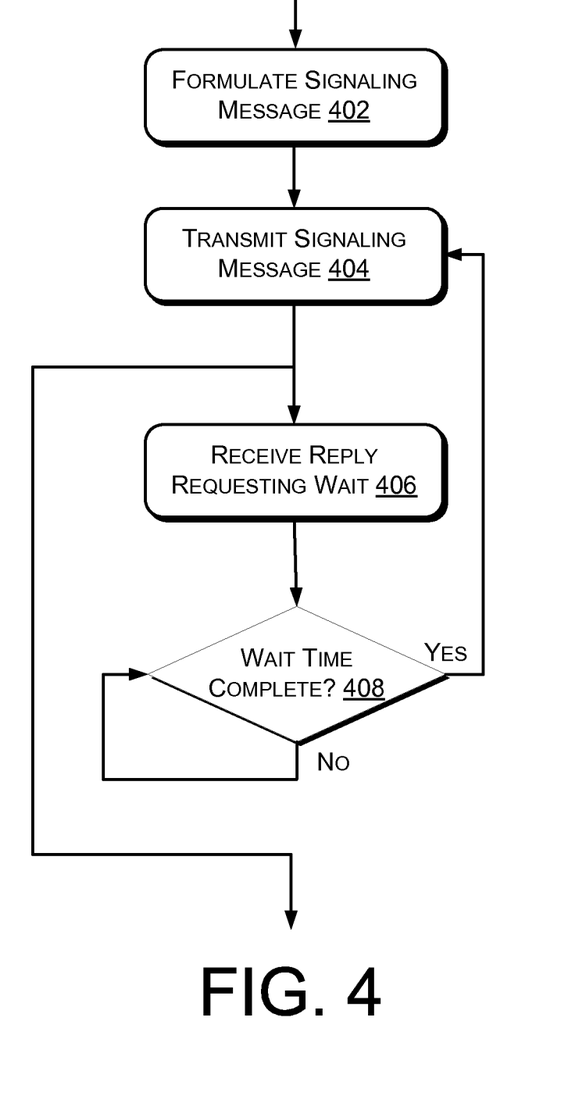
FIG. 4 is a flowchart showing a method of formulating a received signaling message, in accordance with various embodiments.

FIG. 3 illustrates a method of prioritizing and handling a received signaling message, such as a radio signaling message, in accordance with various embodiments. As illustrated, the message handling device 106 first receives 302 a plurality of signaling messages 104. The message handing device 106 receives 302 the signaling messages 104 from sender devices 102. Example operations of the sender devices 102 are shown in FIG. 4 and described in greater detail with reference to that figure.

Continuing to refer to FIG. 3, the message handling device 106 then prioritizes 304 the signaling messages 104 based at least on classifications 108 of the signaling messages 104. In one embodiment, the signaling message classifications 108 are specified by a signaling classification protocol, such as a radio signaling classification protocol, and are represented within headers of the signaling messages 104 by one or more bits of header fields. The signaling classification protocol may also specify a bit length for a representation of a classification 108 and specify the header field that is to include the representation.

In some embodiments, the classifications may be associated with at least one category and the at least one category may be or include one or more of voice call, high priority data signaling, low priority data signaling, an update, a PDP context establishment, a RRC connection establishment request, a RRC radio bearer reconfiguration, a RRC release, a RRC paging message, cell updates, a session initiation protocol (SIP) request or response, or a specific type of SIP request or response.

In one embodiment, the message handling device 106 performs the prioritizing 304 based on rules for handling classifications 108 that are specified by the signaling classification protocol or based on rules for handling classifications 108 that are determined by an operator or service provider.

Once the signaling messages have been prioritized, the message handling device 106 compares 306 the volume of the signaling messages 104 to a threshold volume imposed by physical capacities of the message handling device 106, by an operator, or by a service provider. In another embodiment, the message handling device 106 compares 306 the central processing unit (CPU) load to a threshold CPU load. Based at least on the comparing 306, the message handling device 106 limits how many of the signaling messages 104 are to be processed. In other embodiments, the message handling device 106 performs the comparing 306 and limiting 308 before the prioritizing 304 and only performs the prioritizing 304 if it performs the limiting 308.

The message handling device 106 then processes 310 at least a number of the signaling messages 104 in order of priority, the number processed being based at least on the volume of the signaling messages 104. In some embodiments, the processing 310 includes replying to the signaling messages 104 or performing an act requested by the signaling messages 104. Also or instead, the message handling device 106 performs at least one of (A) queuing 312 unprocessed signaling messages 104 for later processing, (B) replying 314 to a sender device 102 of the at least one unprocessed signaling message 104 with a request 124 that the sender device 102 wait for a specified time before sending another signaling message 104, or (C) discarding 316 unprocessed signaling messages 104. In some embodiments, the message handling device 106 performs the replying 314 in response to determining that the at least one unprocessed signaling message 104 is associated with a specific classification. Also, in one embodiment, the wait specified in the reply request 124 is determined based at least on a classification 108 of the at least one unprocessed signaling message 104.

In various embodiments, the message handling device 106 also receives 318 a payload delivery message associated with one of the signaling messages 104, the payload delivery message having a classification that is different from the classification 108 of the one of the signaling messages 104.

FIG. 4 illustrates a method of formulating a received signaling message, such as a radio signaling message, in accordance with various embodiments. As illustrated, the sender device 102 formulates 402 the signaling message 104, including determining a classification 108 associated with the signaling message 104 based on a signaling classification protocol, such as a radio signaling classification protocol. In one embodiment, the signaling classification protocol specifies a bit length for a representation of the classification 108 and specifies a header field of the signaling message 104 that is to include the representation.

In various embodiments, the classification may be associated with at least one category and the at least one category may be or include one or more of a voice call, high priority data signaling, low priority data signaling, an update, a PDP context establishment, a RRC connection establishment request, a RRC radio bearer reconfiguration, a RRC release, a RRC paging message, cell updates, a session initiation protocol (SIP) request or response, or a specific type of SIP request or response.

After formulating 402 the signaling message 104, the sender device 102 transmits 404 the signaling message 104 to a message handling device 106 for processing in accordance with the signaling message classification 108.

Optionally, the sender device 102 then receives 406 a reply 124 from the message handling device 106 requesting that the sender device 102 wait for a specified time before sending another signaling message 104. After waiting 408 for the specified time period, the sender device 102 then re-transmits the signaling message 104 to the message handling device 106.

Example Systems

FIG. 5 illustrates a component level view of an example message handling device 106, in accordance with various embodiments. As shown, the message handling device 106 includes a memory 502, the memory storing the prioritizing module 116, the message handling module 120, and the queue 122. The message handling device 106 further includes processor(s) 504, interfaces 506, a display 508, transceivers 510, output devices 512, input devices 514, and a drive unit 516 including a machine readable medium 518.

In various embodiments, memory 502 generally includes both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). Memory 502 can also be described as computer storage media and may include volatile and non-volatile, removable and non-removable media implemented in any method or technology for storage of information, such as computer readable instructions, data structures, program modules, or other data.

The prioritizing module 116, the message handling module 120, and the queue 122 stored in memory 504 are also shown in FIG. 1 and described above in detail with reference to that figure.

In some embodiments, the processor(s) 504 is a central processing unit (CPU), a graphics processing unit (GPU), or both CPU and GPU, or other processing unit or component known in the art.

In various embodiments, the interfaces 506 are any sort of interfaces known in the art. Interfaces 506 include any one or more of an Ethernet interface, wireless LAN interface, or a near field interface. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the message handling device 106 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into message handling device 106.

In various embodiments, the display 508 is a liquid crystal display or any other type of display. For example, display 508 may be a touch-sensitive touch screen, and can then also act as an input device or keypad, such as for providing a soft-key keyboard, navigation buttons, or the like.

In some embodiments, the transceiver(s) 510 includes any sort of transceivers known in the art. For example, transceiver (s) 510 may include a radio transceiver and interface that performs the function of transmitting and receiving radio frequency communications via an antenna.

In some embodiments, the output devices 512 include any sort of output devices known in the art, such as a display (already described as display 508), speakers, a vibrating mechanism, or a tactile feedback mechanism. Output devices 512 also include ports for one or more peripheral devices, such as headphones, peripheral speakers, or a peripheral display.

In various embodiments, input devices 514 include any sort of input devices known in the art. For example, input devices 514 may include a microphone, a keyboard/keypad, or a touch-sensitive display (such as the touch-sensitive display screen described above). A keyboard/keypad may be a push button, a multi-key keyboard (such as a conventional QWERTY keyboard), or one or more other types of keys or buttons, and may also include a joystick-like controller and/or designated navigation buttons, or the like.

The machine readable medium 518 stores one or more sets of instructions (e.g., software) embodying any one or more of the methodologies or functions described herein. The instructions may also reside, completely or at least partially, within the memory 502 and within the processor 504 during execution thereof by the message handling device 106. The memory 502 and the processor 504 also may constitute machine readable media 518.

Figure 6:
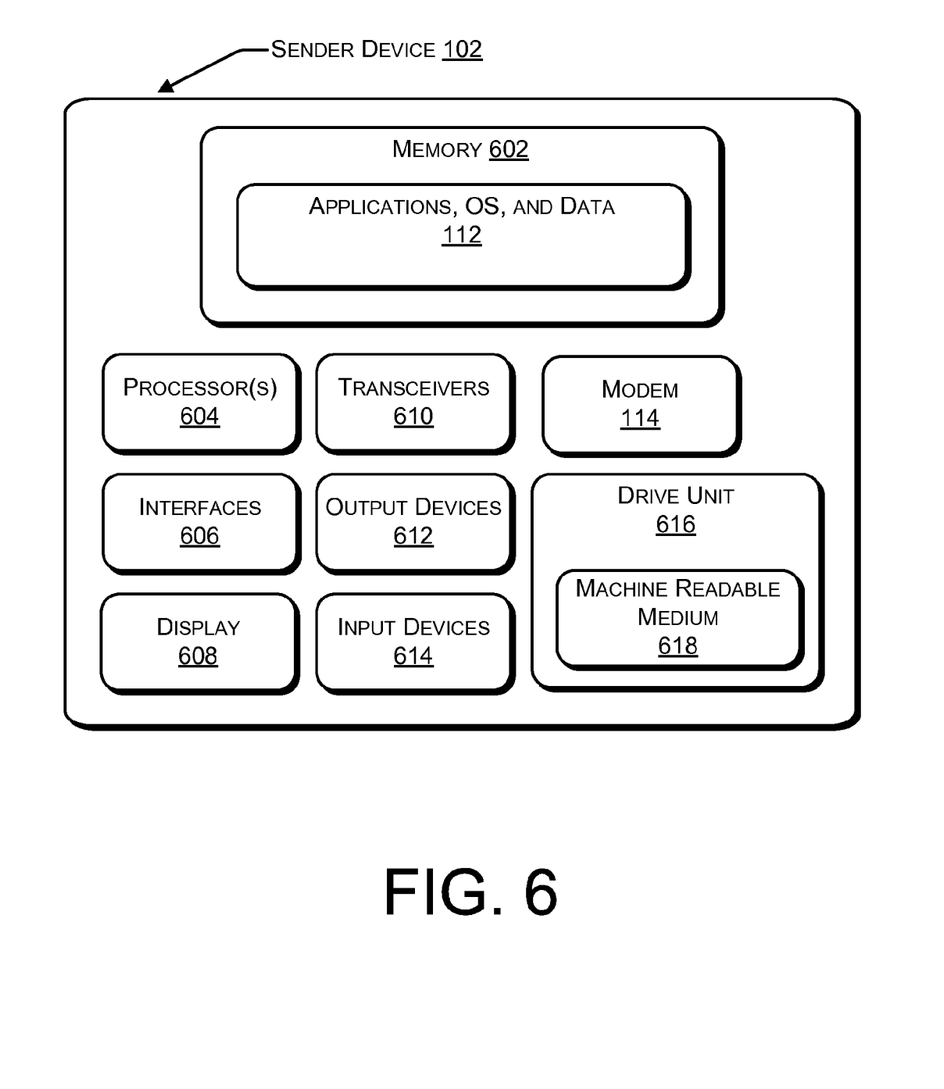
FIG. 6 is a block diagram showing a component level view of a sender device, in accordance with various embodiments.

FIG. 6 illustrates a component level view of an example sender device 102, in accordance with various embodiments. As shown, the sender device 102 may include a memory 602, the memory storing an application, OS, and data 112. The sender device 102 further includes a modem 114 (described above), processor(s) 604, interfaces 606, a display 608, transceivers 610, output devices 612, input devices 614, and drive unit 616 including a machine readable medium 618.

In various embodiments, memory 602 generally includes both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). Additionally, in some embodiments, memory 602 includes a SIM (subscriber identity module) card, which is a removable memory card used to identify a user of the sender device 102 to a service provider network. Memory 602 can also be described as computer storage media and may include volatile and nonvolatile, removable and non-removable media implemented in any method or technology for storage of information, such as computer readable instructions, data structures, program modules, or other data The applications, OS, and data 112 stored in memory 604 are also shown in FIG. 1 and described above in detail with reference to that figure.

In some embodiments, the processor(s) 604 is a central processing unit (CPU), a graphics processing unit (GPU), or both CPU and GPU, or other processing unit or component known in the art.

In various embodiments, the interfaces 606 are any sort of interfaces known in the art. Interfaces 606 include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the sender device 102 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into sender device 102.

In various embodiments, the display 608 is a liquid crystal display or any other type of display commonly used in telecommunication devices. For example, display 608 may be a touch-sensitive display screen, and can then also act as an input device or keypad, such as for providing a soft-key keyboard, navigation buttons, or the like.

In some embodiments, the transceivers 610 include any sort of transceivers known in the art. For example, transceivers 610 may include a radio transceiver and interface that performs the function of transmitting and receiving radio frequency communications via an antenna. The radio interface facilitates wireless connectivity between the sender device 102 and various cell towers, base stations and/or access points.

In some embodiments, the output devices 612 include any sort of output devices known in the art, such as a display (already described as display 608), speakers, a vibrating mechanism, or a tactile feedback mechanism. Output devices 612 also include ports for one or more peripheral devices, such as headphones, peripheral speakers, or a peripheral display.

In various embodiments, input devices 614 include any sort of input devices known in the art. For example, input devices 614 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 618 stores one or more sets of instructions (e.g., software) embodying any one or more of the methodologies or functions described herein. The instructions may also reside, completely or at least partially, within the memory 602 and within the processor 604 during execution thereof by the sender device 102. The memory 602 and the processor 604 also may constitute machine readable media 618.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A computer-implemented method comprising:
   receiving a plurality of signaling messages;
   prioritizing the signaling messages based at least on classifications of the signaling messages;
   processing at least a number of the signaling messages in order of priority, the number processed being based at least on a volume of the signaling messages; and
   for at least one unprocessed signaling message, replying to a sender of the at least one unprocessed signaling message with a request that the sender wait for a specified time before sending another signaling message, wherein the specified time is selected based on the classification of the at least one unprocessed signaling message.

2. The method of claim 1, wherein in the signaling message classifications are specified by a signaling classification protocol.

3. The method of claim 2, wherein the prioritizing is further based on rules for handling classifications that are specified by the signaling classification protocol.

4. The method of claim 2, wherein at least one of the classifications is represented within a header of one of the signaling messages by one or more bits of a header field.

5. The method of claim 4, wherein the signaling classification protocol specifies a bit length for a representation of a classification and specifies the header field that is to include the representation.

6. The method of claim 1, wherein the classifications are associated with at least one category, the at least one category including at least one of a voice call, high priority data signaling, low priority data signaling, an update, a packet data protocol (PDP) context establishment, a radio resource control (RRC) connection establishment request, a RRC radio bearer reconfiguration, a RRC release, a RRC paging message, cell updates, a session initiation protocol (SIP) request or response, or a specific type of SIP request or response.

7. The method of claim 1, wherein the prioritizing is further based on rules for handling classifications that are determined by an operator or service provider.

8. The method of claim 1, further comprising:
   comparing the volume of the signaling messages to a threshold volume imposed by physical capacities of equipment performing the processing, by an operator, or by a service provider; and
   based at least on the comparing, limiting how many of the signaling messages are to be processed.

9. The method of claim 1, further comprising queuing unprocessed signaling messages for later processing.

10. The method of claim 1, wherein the processing includes replying to the signaling messages or performing an act requested by the signaling messages.

11. The method of claim 1, further comprising receiving a payload delivery message associated with one of the signaling messages, the payload delivery message having a classification that is different from the classification of the one of the signaling messages.

12. An article of manufacture comprising:
   a tangible storage medium; and
   computer-readable programming instructions stored on the tangible storage medium and configured to program a computing device to perform operations including:
   receiving a plurality of radio signaling messages;

determining whether a volume of the signaling messages exceeds a threshold; and responsive to determining that the volume of the radio signaling messages exceeds the threshold, prioritizing the radio signaling messages based at least on classifications of the radio signaling messages;

processing at least a number of the radio signaling messages in order of priority, the number processed being based at least on the volume of the radio signaling messages; and for at least one unprocessed radio signaling message, replying to a sender of the at least one unprocessed radio signaling message with a request that the sender wait for a specified time before sending another signaling message, wherein the replying is performed conditionally based on determining that the at least one unprocessed radio signaling message is associated with a specific classification included in a radio signaling classification protocol.

13. The article of claim 12, wherein the wait specified in the request is determined based at least on a classification of the at least one unprocessed radio signaling message.

14. The article of claim 12, wherein the operations further include discarding the at least one unprocessed radio signaling message after performing the replying.

15. A telecommunication device comprising:
a processor; and
a plurality of programming instructions configured to be operated by the processor to perform operations including:
formulating a signaling message, including determining a classification associated with the signaling message based on a signaling classification protocol; and
transmitting the signaling message to a server for processing in accordance with the signaling message classification,
wherein the signaling classification protocol specifies:
when a first communication protocol is used, a first bit length for a representation of the classification and a first header field of the signaling message that is to include the representation, and
when a second communication protocol is used, a second bit length for the representation of the classification and a second header field of the signaling message that is to include the representation,
the first bit length and second bit length being different bit lengths, the first header field and second header field being different header fields, and the first and second communication protocols are different communication protocols.

16. The telecommunication device of claim 15, wherein the operations further include:
receiving a reply from the server requesting that the telecommunication device wait for a specified time before sending another signaling message; and
after waiting for the specified time period, re-transmitting the signaling message to the server.

17. The telecommunication device of claim 15, wherein the classification is associated with at least one category, the at least one category including at least one of a voice call, high priority data signaling, low priority data signaling, an update, a packet data protocol (PDP) context establishment, a radio resource control (RRC) connection establishment request, a RRC radio bearer reconfiguration, a RRC release, a RRC paging message, cell updates, a session initiation protocol (SIP) request or response, or a specific type of SIP request or response.

* * * * *